US006726262B2

United States Patent
Marijnissen et al.

(10) Patent No.: US 6,726,262 B2
(45) Date of Patent: Apr. 27, 2004

(54) BUMPER ASSEMBLY INCLUDING AN ENERGY ABSORBER

(75) Inventors: Kees Marijnissen, Bergen op Zoom (NL); Stephen F. Shuler, Royal Oak, MI (US); Srikanth M. Santhanam, Windsor (CA)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 10/182,791

(22) PCT Filed: Oct. 29, 2001

(86) PCT No.: PCT/US01/51274
§ 371 (c)(1),
(2), (4) Date: Jul. 30, 2002

(87) PCT Pub. No.: WO03/037688
PCT Pub. Date: May 8, 2003

(65) Prior Publication Data
US 2003/0080573 A1 May 1, 2003

(51) Int. Cl.[7] ............................................. B60R 19/04
(52) U.S. Cl. ........................................ 293/121; 293/120
(58) Field of Search ................................ 293/120, 121, 293/133, 109, 110

(56) References Cited

U.S. PATENT DOCUMENTS

| 3,938,841 | A | 2/1976 | Glance et al. |
| 4,424,996 | A | 1/1984 | Yoshiyuki |
| 4,951,986 | A | 8/1990 | Hanafusa et al. |
| 6,082,792 | A | 7/2000 | Evans et al. |
| 6,286,879 | B1 | 9/2001 | Haque et al. |
| 6,406,081 | B1 * | 6/2002 | Mahfet et al. ............. 293/120 |
| 6,575,510 | B2 * | 6/2003 | Weissenborn ............. 293/120 |
| 2002/0149214 | A1 * | 10/2002 | Evans ....................... 293/120 |

* cited by examiner

Primary Examiner—Jason Morrow
(74) Attorney, Agent, or Firm—Armstrong Teasdale LLP

(57) ABSTRACT

A bumper assembly (20) for an automotive vehicle. The bumper assembly includes comprises a beam (24) and an energy absorber (22). In one example embodiment, the energy absorber is tunable for meeting predetermined criteria for both low speed and pedestrian impacts.

15 Claims, 6 Drawing Sheets

US 6,726,262 B2

BUMPER ASSEMBLY INCLUDING AN ENERGY ABSORBER

CROSS REFERENCE TO RELATED APPLICATIONS

This application claims the benefit of International Application No. PCT/US01/51274 filed Oct. 29, 2001.

BACKGROUND OF THE INVENTION

This invention relates generally to bumpers and, more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a foam energy absorber. Foam based energy absorbers typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of the beam and/or vehicle structure.

BRIEF SUMMARY OF THE INVENTION

In one aspect, a bumper system comprising a beam configured to attach to vehicle rails and an energy absorber coupled to the beam is provided. The energy absorber is tunable for meeting predetermined criteria for both low speed and pedestrian impacts.

In another aspect, a bumper assembly for an automotive vehicle is provided. The bumper assembly comprises a beam configured to attach to vehicle rails, an energy absorber, and a fascia attachable to the energy absorber to substantially envelop the beam and energy absorber. The energy absorber is tunable for meeting predetermined criteria for both low speed and pedestrian impacts.

In yet another aspect, an energy absorber for a vehicle bumper system is provided. The energy absorber is tunable for meeting predetermined criteria for both low speed and pedestrian impacts and comprises a flanged frame and a body extending from the frame. The body comprises a plurality of lobes.

DETAILED DESCRIPTION OF THE INVENTION

A bumper system that includes a tunable energy absorber is described below in detail. In an example embodiment, an energy absorber of the non-foam type is attached to a beam. The beam is fabricated, for example, from steel, aluminum, or glass mat thermoplastic (GMT). The energy absorber, in the example embodiment, is fabricated from Xenoy® material and is tunable so as to meet desired impact criteria, e.g., pedestrian and low speed impacts. More particularly, a front portion of the energy absorber is tuned, and tunable, to absorb pedestrian leg form impact, and a rear portion of the energy absorber is tuned, and tunable, for low speed barrier and pendulum impact. Impact forces during the specified types of impacts are maintained just below a predetermined level by deforming the energy absorber and beam until the kinetic energy of the impact event has been absorbed. When the impact is over, the energy absorber returns substantially to its original shape and retains sufficient integrity to withstand subsequent impacts.

Although the bumper system is described below with reference to specific materials (e.g. Xenoy® material (commercially available from General Electric Company, Pittsfield, Mass.) for the energy absorber), the system is not limited to practice with such materials and other materials can be used. For example, the beam need not necessarily be a steel, aluminum, or GMT compression molded beam, and other materials and fabrication techniques can be utilized. Generally, the energy absorber is selecting from materials that result in efficient energy absorption, and the beam materials and fabrication technique are selected to result in a stiff beam.

Figure 1:
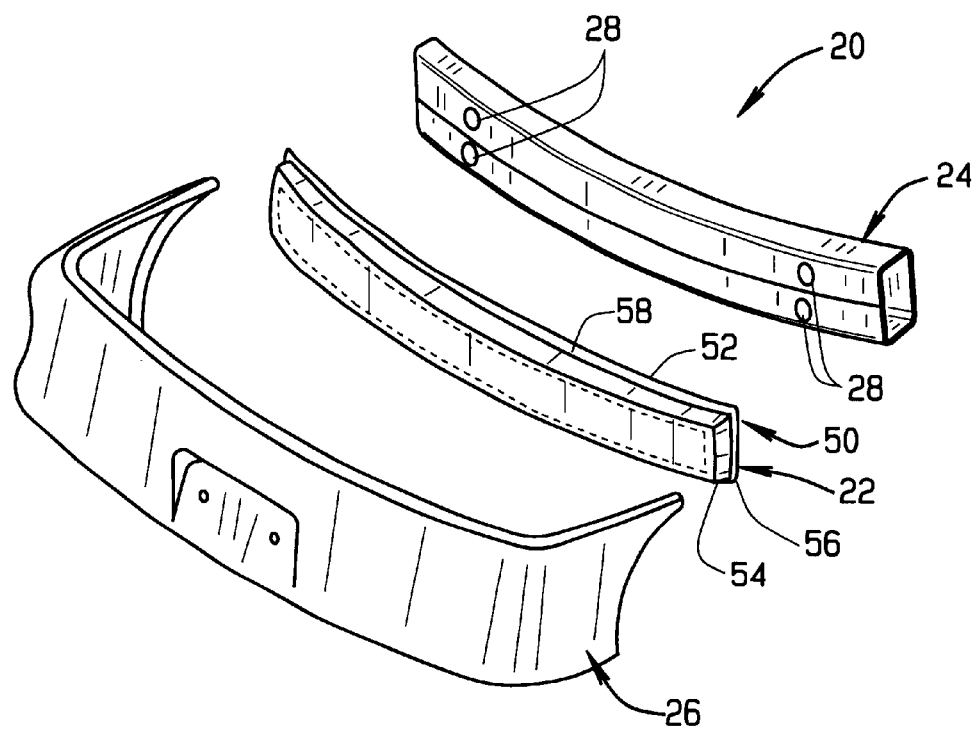
FIG. 1 is an exploded perspective view of one embodiment of a bumper assembly including an energy absorber.

FIG. 1 is an exploded perspective view of one embodiment of a bumper system 20. System 20 includes an energy absorber 22 and a beam 24. Energy absorber 22 is positioned between beam 24 and a fascia 26 which, when assembled, form a vehicle bumper. As should be understood by those skilled in the art, beam 24 is attached to lengthwise extending frame rails (not shown).

Fascia 26 typically is generally formed from a thermoplastic material amenable to finishing utilizing conventional vehicle painting and/or coating techniques. Generally, fascia 26 envelops both energy absorber 22 and reinforcing beam 24 such that neither component is visible once attached to the vehicle.

Beam 24, in the example embodiment, is fabricated from extruded aluminum. In other embodiments, beam 24 is fabricated from roll formed steel or a compression molded glass mat thermoplastic (GMT). Beam 24 can have one of multiple geometries, including being configured as a B-section, a D-section, an I-beam, or having a C or W cross-sectional shape. The geometry of beam 24 is selected to provide a desired section modulus depending on the particular application in which the beam is to be used. Beam 24 includes rail attachment openings 28 so that bolts (not shown) can pass therethrough to secure bumper system 20 to the frame rails.

Energy absorber 22 includes a frame 50 having first and second longitudinally extending flanges 52 and 54, respectively, which overlap beam 24. Flange 52 is u-shaped and flange 54 includes a finger 56 which forms a snap fit with beam 24, i.e., finger 56 snaps over an end of beam 24. Absorber 22 further includes a body 58 that extends outward from frame 50. The specific configuration of body 58 is illustrated and described below in connection with FIGS. 2, 3, and 4.

Figure 2:
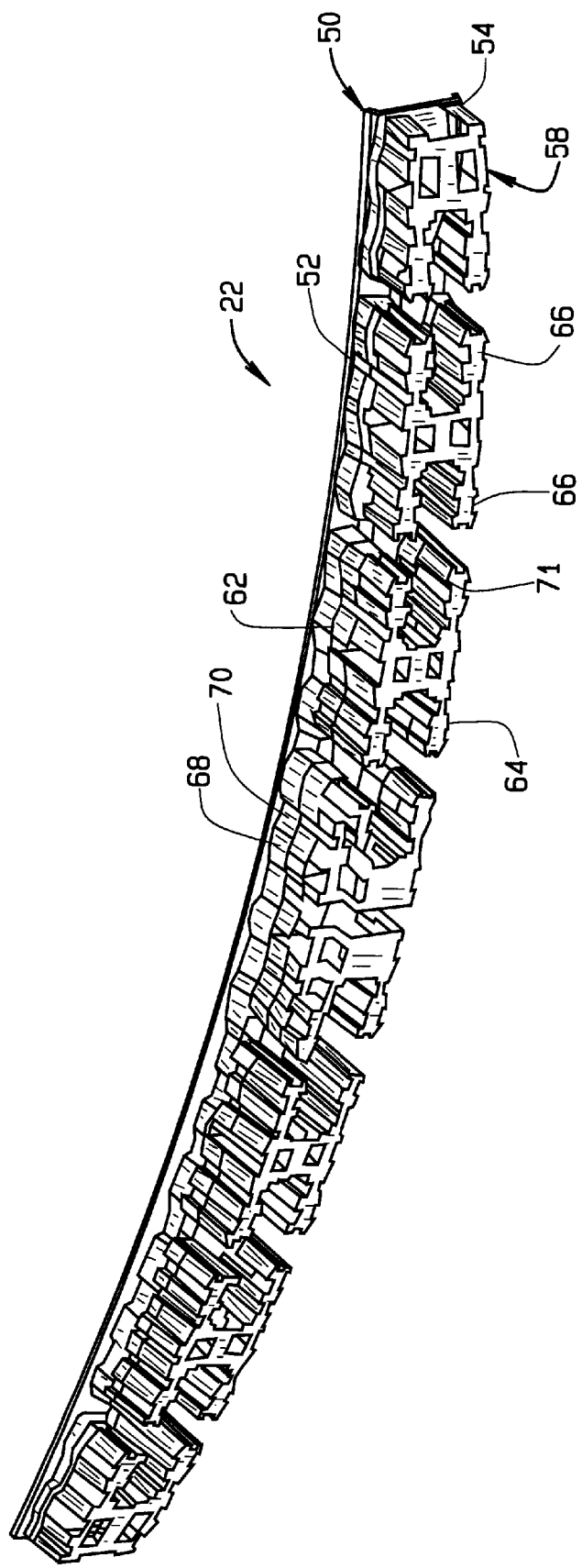
FIG. 2 is a front perspective view of the energy absorber.
Figure 3:
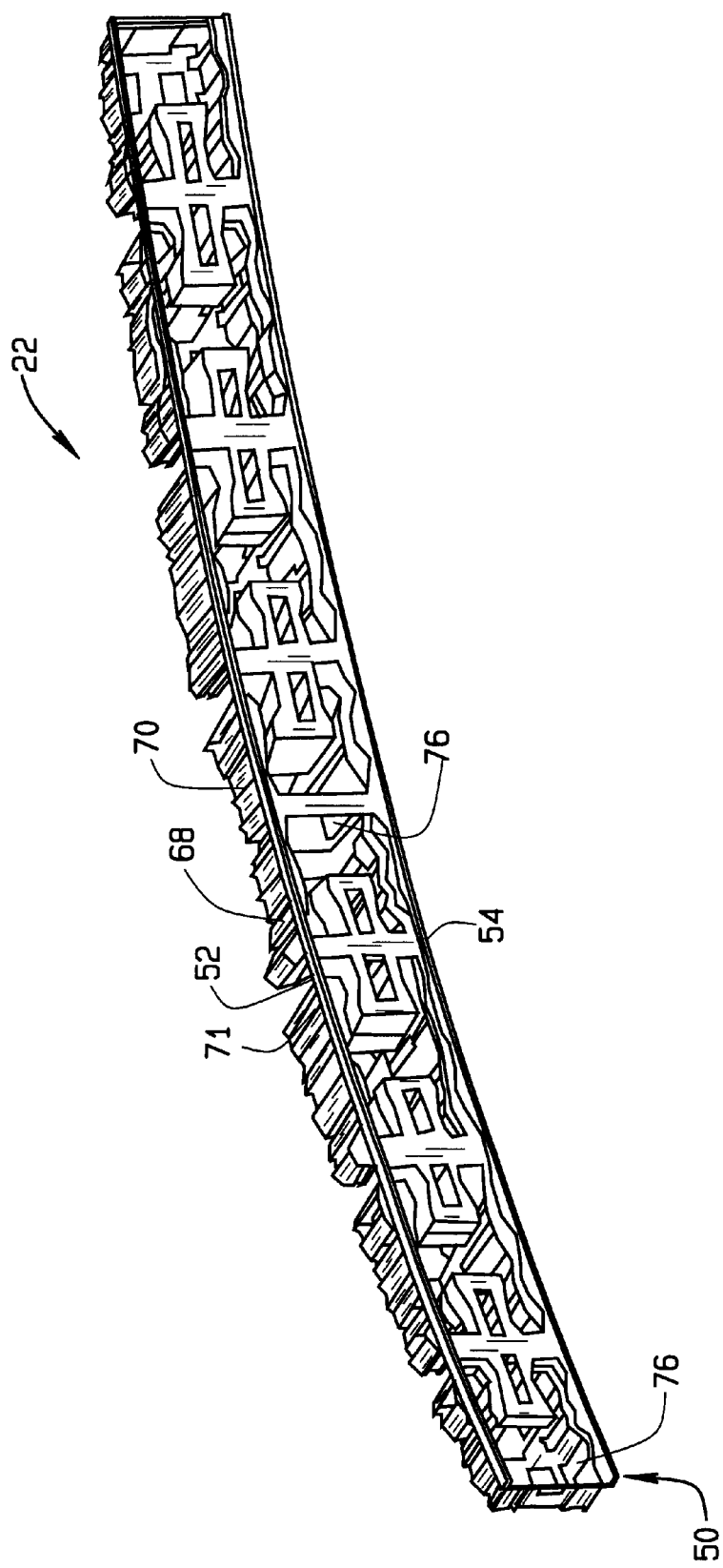
FIG. 3 is a rear perspective view of the energy absorber shown in FIG. 2.
Figure 4:
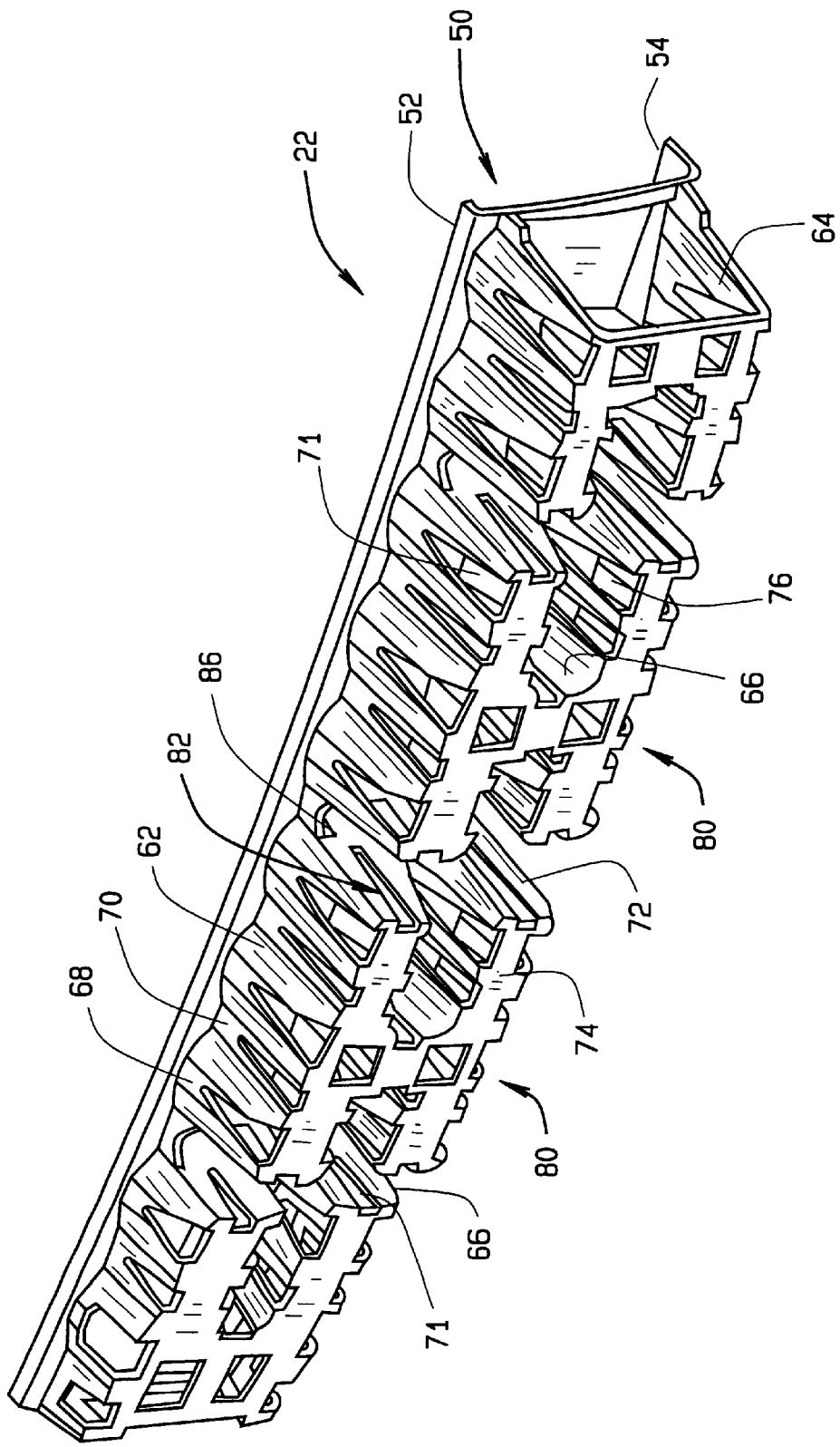
FIG. 4 an enlarged view of a portion of the energy absorber shown in FIGS. 2 and 3.

Referring now to FIGS. 2, 3, and 4, energy absorber body 58, sometimes referred to herein as a front portion, includes a first transverse wall 62 and a second transverse wall 64 having a plurality of tunable crush boxes 66 extending therebetween. Transverse walls 62, 64 are rippled and include alternating raised areas 68 and depressed areas 70 which provide the transverse walls with an added degree of stiffness to resist deflection upon impact. Transverse walls 62 and 64 further include a plurality of windows or openings 71. The width and depth dimensions of the ripples, as well as the dimensions of openings 71, can be modified to achieve different stiffness characteristics as desired. Crush boxes 66 include side walls 72, an outer wall 74, and open areas 76 that extend to inner frame 50.

FIG. 4 is a perspective view of a portion of energy absorber 22. Absorber 22 includes a plurality of lobes 80 (three and one half lobes are shown in FIG. 4). In the example embodiment, energy absorber 22 has seven lobes 80. Of course, in other embodiments, fewer or more lobes can be incorporated into the energy absorber.

In the example embodiment, side walls 72 and traverse walls 62 and 64 vary linearly in thickness from a first front-most portion 82 to a rearmost portion 86. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 82 to rearmost portion 86 and is between about 1 mm to about 7 mm. In still further embodiments, the thickness of the walls are stepped. Particularly, the thickness of the walls of front-most portion 82 is constant and the thickness of the walls of rearmost portion 86 is constant with the walls of rearmost portion 86 thicker than the walls of front-most portion 82.

Energy absorber 22 is tunable in that by selecting a thickness of each portion 82 and 86, the response of energy absorber 22 can be altered depending on the application in which absorber 22 is used. For example, front portion 82 of energy absorber 22 is tuned, and tunable, to absorb pedestrian leg form impact, and rear portion 86 is tuned, and tunable, for low speed and pendulum impact.

Figure 5:
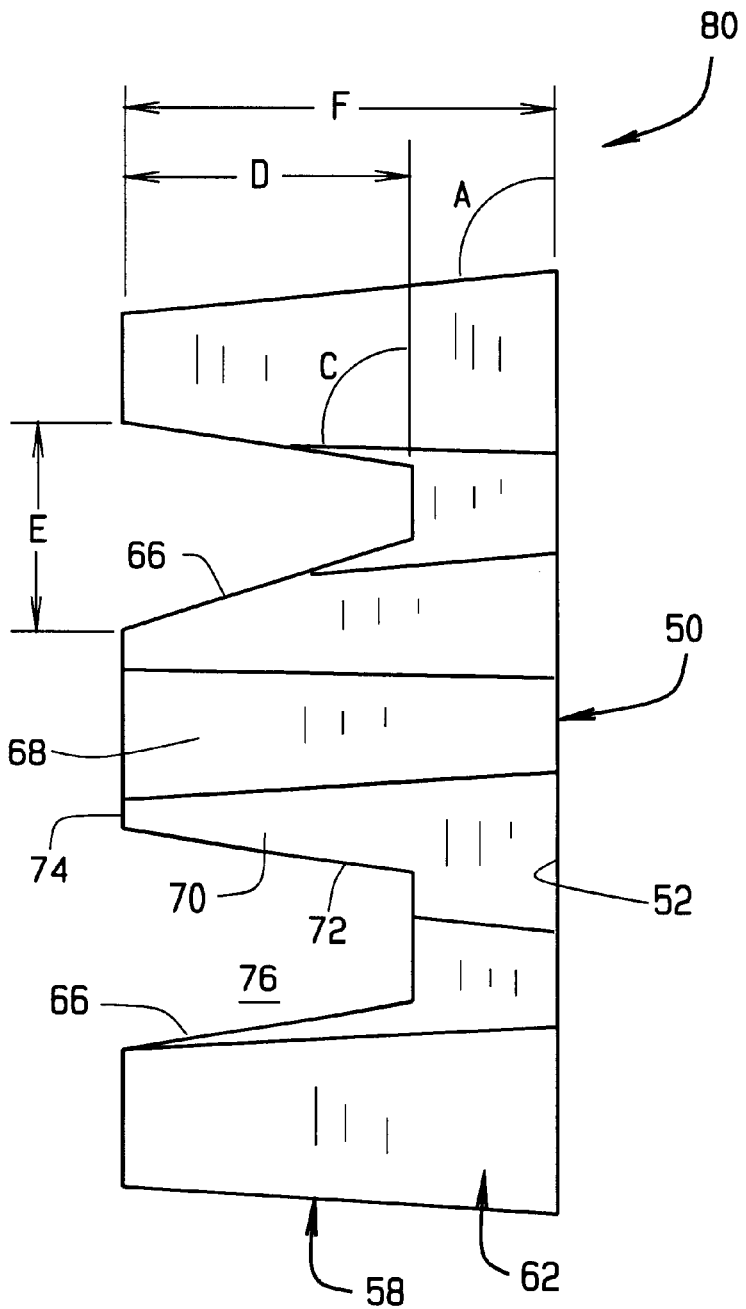
FIG. 5 is a top view of the lobe shown in FIG. 4.
Figure 6:
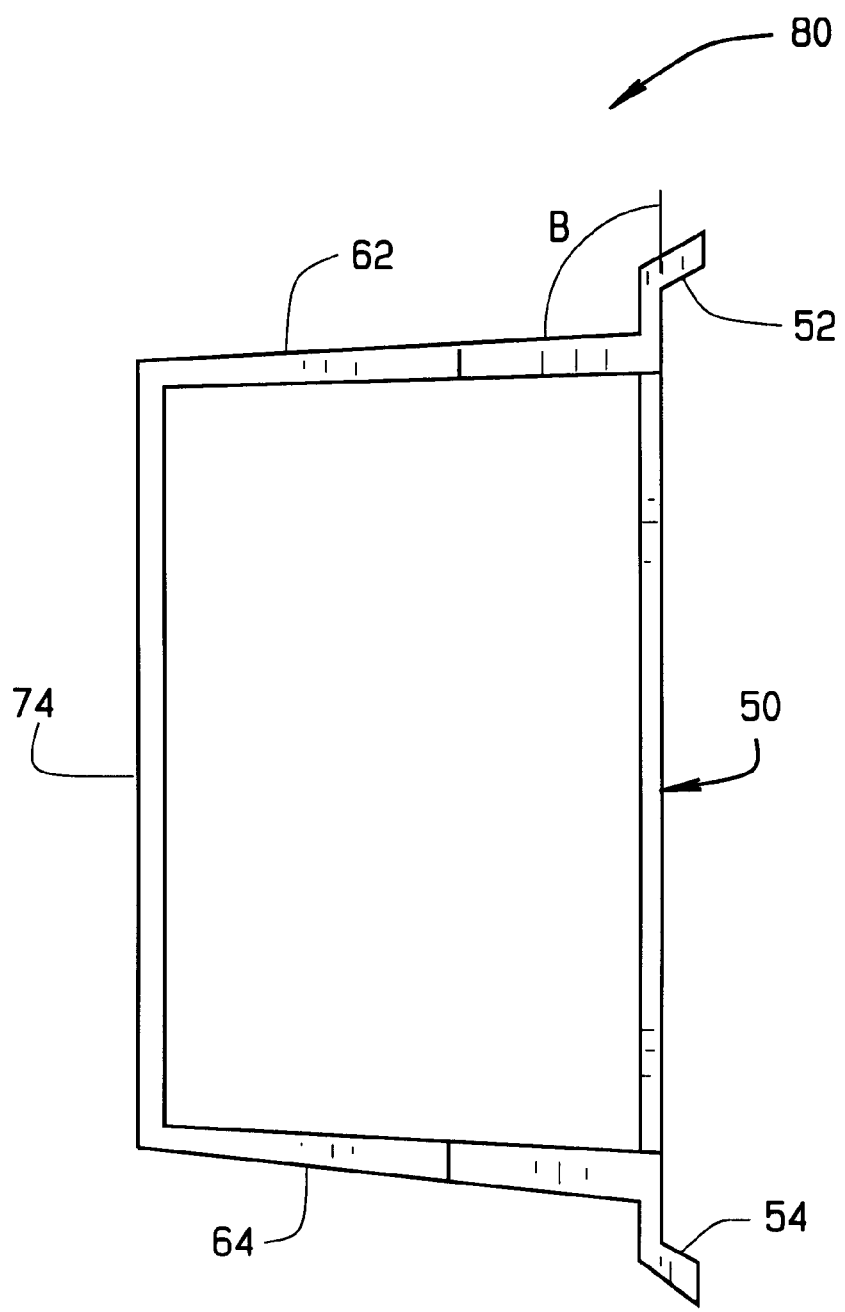
FIG. 6 is a cross sectional view through a center of an energy absorber lobe shown in FIG. 4.

Referring to FIGS. 5 and 6, which are top and cross sectional views of lobe 80, a number of dimensions are illustrated by the letters A, B, C, D, E, and F. Each such dimension is selectable so that absorber 22 is tunable to a particular application. Example ranges of the dimensions illustrated in FIGS. 5 and 6 are set forth below.

A ranges from about 91 degrees to about 98 degrees.
B ranges from about 91 degrees to about 98 degrees.
C ranges from about 30 degrees to about 90 degrees.
D ranges from about 20 mm to about 90 mm.
E ranges from about 10 mm to about 40 mm.
F ranges from about 50 mm to about 120 mm.

Each lobe 80 can, of course, have any one of a number of different geometries depending on the impact energy requirements for the vehicle. Each lobe 80 has an axial crush mode in both barrier and pendulum impacts according to Federal Motor Vehicle Safety Standard (FMVSS) and also has a stiffness tunability in order to meet the desired impact load deflection criteria. That is, the wall thicknesses as illustrated in FIG. 4 and the dimensions illustrated in FIGS. 5 and 6 can be selected for any given application in an effort to meet the targeted criteria.

For example, the walls may have a thickness that broadly ranges from about 1.0 mm to about 7.0 mm. More specifically, for certain low speed or pedestrian impact applications the nominal wall thickness may generally range from about 1.0 mm to about 5.0 mm and for other applications, particularly those for a 5 mph FMVSS system, the nominal wall thickness for the side and rear walls would more likely be in the range of about 2.5 mm to 7.0 mm.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

The characteristics of the material utilized to form energy absorber 22 include high toughness/ductility, thermally stable, high energy absorption capacity, a good modulus-to-elongation ratio and recyclability. While the energy absorber may be molded in segments, the absorber also can be of unitary construction made from a tough plastic material. An example material for the absorber is Xenoy material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (l/hdpe), polypropylene (pp) and thermoplastic olefins (tpo).

While the invention has been described in terms of various specific embodiments, those skilled in the art will recognize that the invention can be practiced with modification within the spirit and scope of the claims.

What is claimed is:
1. A bumper system, comprising:
a beam configured attach to vehicle rails; and
an energy absorber coupled to said beam, said energy absorber being tunable for meeting predetermined criteria for both low speed and pedestrian impacts, said energy absorber comprising:
a flanged frame for attachment to said beam; and
a body extending from said frame, said body comprising a plurality of lobes, at least one of said lobes comprising first and second spaced transverse walls, each said first and second traverse walls comprising windows of predetermined shape and size.

2. A bumper system (20) according to claim 1 wherein said energy absorber (22) is injection molded.

3. A bumper system (20) according to claim 1 wherein said beam (24) is at least one of steel, aluminum, thermoplastic, and glass mat thermoplastic.

4. A bumper system according to claim 1 wherein said first and second spaced transverse walls are rippled, and wherein each said lobe comprises at least one crush box.

5. A bumper system (20) according to claim 4 wherein said crush box (66) comprises side and outer walls (72, 74).

6. A bumper system (20) according to claim 5 wherein said side and outer walls (72, 74) comprise windows (71) of predetermined shape and size.

7. A bumper assembly for an automotive vehicle comprising:
 a beam configured to attach to vehicle rails;
 an energy absorber coupled to said beam, said energy absorber being tunable for meeting predetermined criteria for both low speed and pedestrian impacts; and
 a fascia attachable to said energy absorber to substantially envelop said beam and said energy absorber, said energy absorber comprising:
  a flanged frame for attachment to said beam; and
  a body extending from said frame, said body comprising a plurality of lobes, each said lobe comprising first and second spaced transverse walls, each said first and second traverse walls comprising windows of predetermined shape and size.

8. A bumper assembly (20) according to claim 7 wherein said energy absorber (22) is injection molded.

9. A bumper assembly (20) according to claim 7 wherein said beam (24) comprises at least one of steel, aluminum, thermoplastic, and glass mat thermoplastic.

10. A bumper assembly according to claim 7 wherein said first and second spaced transverse walls are rippled, and wherein each said lobe comprises at least one crush box, each said crush box comprising side and outer walls.

11. A bumper assembly (20) according to claim 10 wherein said side and outer walls (72, 74) comprise windows (71) of predetermined shape and size.

12. An energy absorber for a vehicle bumper system, said energy absorber being tunable for meeting predetermined criteria for both low speed and pedestrian impacts and comprising a flanged frame and a body extending from said frame, said body comprising a plurality of lobes, at least one of said lobes comprising first and second spaced transverse walls, each said first and second traverse walls comprising windows of predetermined shape and size.

13. An energy absorber (22) according to claim 12 wherein said energy absorber is injection molded.

14. An energy absorber according to claim 12 wherein said first and second spaced transverse walls are rippled, and wherein each said lobe comprises at least one crush box, each said crush box comprising side and outer walls.

15. An energy absorber (22) according to claim 14 wherein said side and outer walls (72, 74) comprise windows (71) of predetermined shape and size.

* * * * *